3,184,288
PRODUCTION OF IMPROVED ASBESTOS FIBER
Auguste Louis de Lisle, 6913 E. Cherry Lynn,
Scottsdale, Ariz.
No Drawing. Filed Feb. 14, 1962, Ser. No. 173,121
8 Claims. (Cl. 23—110)

My invention relates to an improved asbestos fiber and method of producing the same. It relates more in particular to the production of improved asbestos fiber particularly adapted for filtering.

The principal object of the invention is the production of an improved asbestos fiber particularly adapted for use in filters, and having specific utility in the food fields.

Another object is the production of an improved filter grade asbestos fiber having relatively very low percentages of contaminants in which the individual fibers have not been degraded by the contaminant removal procedures.

Still another method is to remove contaminants from milled asbestos fiber without degrading such fiber.

A further object is to produce filter grade asbestos fiber from raw asbestos fiber materials not normally considered suitable for the production of a filter grade final product.

Other specific objects and features of the invention will appear from the following detailed description in which the manner of attaining the objects of the invention is explained and several illustrative examples of the manner of practising the invention are given.

Before going to the description of the invention, it is advisable first to give some general description of asbestos, its characteristics, its conventional treatment, and some of the practices in connection with its use.

The term asbestos is used generically to identify any mineral of a fibrous texture capable of being woven into a fabric, and historically several types of minerals have been so used, giving rise to the generic use of the term. Thus, generically, a fibrous type of amphibolite is called asbestos, but most asbestos, particularly commercial grades, are a variety of serpentine called chrysotile. It is this commercial variety of asbestos, the so-called asbestos of commerce, to which my invention relates.

Chrysotile asbestos is made up of very delicate silky white fibers exhibiting a greenish to yellowish color when in a group. It is probably because of the extreme fineness of individual fibers that they form a good filtering medium, particularly for the filtering of colloids. The fibril diameters are such that over a million individual fibers are necessary to measure one inch. Their diameters are commonly expressed in Angstrom, usually of the order of 300 Angstrom. Electron microscopy appears to indicate that the fibril is not a crystalline rod but rather a helix made up of trapezoidal plate lattices, which, due to their joining angles, form almost a closed helix. Their shape, as well as their small diameter, may have a bearing on their filtering function; and this may also help to explain the tendency of the fibers to floc when dispersed in aqueous media.

Commercially, asbestos is graded in accordance with the length of the fiber, the degree of softness or harshness of the fiber, and the amount and distribution of contaminants. There are standard commercial grading procedures, using numbers and letters as applied to the mined and milled product. Dry milling is usually practised to remove the fibrous portions from the non-fibrous portions of the ore and to break up the "bundles" and "pencils" of fibers. Soft fibers separate more readily than harsh fibers. Indeed, the grading of fibers as to softness and hardness is a measure of the relative ease with which a bundle breaks up into individual fibers, or breaks across the fibers when bent.

Chrysotile asbestos fibers occur as diabase intrusion into limestone. It is thought that the magnesium silicate of the chrysotile derived from olivine, which in turn is an orthosilicate of magnesium in which the ratio of iron to magnesium varies considerably. In any case, the impurities in asbestos, iron and calcium, the latter occurring principally as the carbonate and sulfate (gypsum), vary considerably in proportion and distribution. They are note readily removed without at the same time degrading the fiber. Apparently some calcium is also present as a partial replacement of the magnesium in the hydrated magnesium silicate which is the chrysotile. Iron is apparently present in the form of magnetite, which is less susceptible to simple stoichiometric acid leaching than haematite. Badly weathered asbestos, such as that occurring in the Casiar talus in Canada may have most of the iron present as haematite, but these deposits are inadequate to supply commercial requirements.

No effective substitute for asbestos as a filter medium has been found, and there is an insufficient supply of top grade asbestos to meet all filter needs. Even the highest grade asbestos, as a rule, requires some treatment to remove the lime and iron present. The important properties in filter grade asbestos are, first, purity, then softness of fiber and, finally, fiber length, as contrasted with grading generally in which fiber length is considered the most important characteristic. Heretofore, the practice has been to dissolve out the lime and iron with a strong acid, usually hydrochloric acid (HCl) because HCl appears to attack the magnesium of the chrysotile fiber less than other acids such as nitric acid, and its salts formed in this instance are water soluble. Lime, as calcium carbonate, is relatively quickly removed, gypsum (dehydrated $CaSO_4$) less readily, and iron only after long treatment with a two percent to ten percent HCl solution varying from hours to weeks. This long treatment causes progressive deterioration of the fiber. The costs of the process in labor and acid used and losses from fiber degradation are such that high iron content asbestos is impractical as a source of a filter grade final product.

I have found that by soaking the milled fiber in a solution of ammonium chloride ($NH_4Cl$) under suitable controlled conditions, I can remove substantialy all of the carbonate and gypsum lime and practically all of the iron with very little, if any, fiber degradation even after relatively long treatment. On a practical basis, I have found that it is unnecessary to remove all of the contaminants to produce a good filter grade asbestos fiber, but it is enough if the soluble impurities still in the fiber at the end of the treatment are of a low order, say 0.1% or less of lime as the carbonate and 0.02% of iron as $Fe_2O_3$.

As a starting material I prefer to use a milled chrysotile asbestos fiber between the grades 3M and 4K, although some extension of this range is possible. The general manner of proceeding is first to determine the total calcium and iron by the thiocyanate and oxalic acid methods respectively, and then to test for soluble lime and iron by suspending a sample of the fiber in a one percent to two percent solution of HCl and maintaining the strength of the solution for seventy-two hours. The purpose of the analysis is to determine the approximate time of treatment required. After analysis the fiber may then be directly treated with the $NH_4Cl$ solution, or it may first be subjected to a relatively mild HCl treatment to remove the more relatively soluble lime. The analysis is of assistance in determining whether this preliminary HCl treatment is indicated.

After the fiber has been treated with the $NH_4Cl$ solution for a time believed sufficient to accomplish the desired purification, a sample of the fiber is removed, washed, and checked by a standard method to determine the residual soluble impurities. If the results are within the planned requirements, the entire batch is washed at least twice and dried, all as will be explained. Among the tests for soluble impurities are extraction with a one percent citric acid solution, according to a procedure commonly employed in Europe, or by means of a one percent to two percent solution of HCl using established procedures. All of these methods may be used, but I have employed in most of my work the so-called Roma method developed in the wineries of California, and based on the use of a one percent HCl solution.

Suitably the $NH_4Cl$ solution used for extraction of impurities from the asbestos fibers is of five percent to ten percent strength, although some departure from this concentration is possible while still obtaining suitable results. For each one hundred parts by weight of solution, from five to fifteen parts by weight of fiber should be used. A proportion of one part of milled asbestos to ten parts of water may be used to advantage as a standard. In general, shorter fibers produce a less dense dispersion, and the proportion of fibers to solution can be increased as the fibers get shorter. There is some exothermia from the treatment but as a rule some heat should be used, and preferably the temperatures should be maintained somewhere between 70° C. and 110° C., or just below the boiling point of the solution. The time of treatment will vary somewhere between twenty and one-hundred-and-twenty hours, depending on the conditions of treatment, the starting material, and the degree of purity desired. I do not wish, however, to express a limitation as to the time of treatment, but merely to indicate normal operating limits for the guidance of those skilled in the art.

The progress of the treatment can be observed, in part at least, by the flocculation of the asbestos fibers. When the fibers are first dispersed in water or aqueous solution during their treatment, they form clearly recognizable flocs; but as the treatment with $NH_4Cl$ continues the fibers begin to disperse until after about four hours the flocs almost all disappear. They then begin to reflocculate after about six hours, and definite flocs are present as the processing runs to completion.

The mechanics of impurity removal in the process of the present invention are not easily explained, but may involve an electrolyte solubilization action rather than direct chemical reaction; though certain chemical reactions may be involved in the over-all procedure. The carbonate of lime apparently reacts with the ammonium chloride to form soluble calcium chloride. The calcium sulfate appears to be dissolved as such in the $NH_4Cl$ solution. Sandy constituents present and some iron separate from the mass as the fibers deflocculate and may be recovered from the bottom of the processing tank. Iron appears to be reduced from magnetite to haematite, based on color changes observed, but observed color changes can also indicate formation of an iron ammonium complex, at least some of which is apparently formed. Some gentle stirring or agitation during the $NH_4Cl$ treatment is helpful in promoting reaction and separating out insoluble sand and the like. A magnet may be used to promote more rapid removal of iron if desired. In general, however, most of the impurities are dissolved in solution, so that the fibers must be washed thoroughly after removal from the treating solution.

While the milled asbestos may be treated directly with the $NH_4Cl$ solution, it is sometimes advantageous to first dissolve the lime in dilute hydrochloric acid, particularly when there is a substantial proportion of calcium as the carbonate. This is accomplished cold by first mixing the fiber with ten to twenty parts of water and then introducing a five percent HCl solution gradually until the resulting solution shows a pH of about 4 or 5. After titration has been accomplished, a suitable amount of dry ammonium chloride may be introduced directly into the solution, heat applied, and the solution allowed to stand a suitable length of time.

More specific aspects of the invention may be observed by reference to the specific examples which follow.

*Example 1*

Thirty pounds of 3Z asbestos fiber from the Western Chemical Mine near Globe, Arizona on analysis showed a total of three-and-a-half percent iron and twelve percent calcium. Acid soluble iron was found to be 0.4% and calcium 10.5%. The thirty pounds of fiber were then dispersed in three hundred pounds of water and titrated with a five percent HCl solution until the pH was stable at 4. Thirty pounds of commercial sal ammoniac, fertilizer grade, were then added and the temperature raised and maintained at boiling. The flocced asbestos gradually dispersed until after about four hours the flocs had almost disappeared. After about two more hours, or a total of six hours, reflocculation was apparent. During the disperse period much of the contained sand and iron dropped out. The liquid was gently stirred with a paddle to which several small permanent magnets were attached, and some iron adhered to the magnets.

At the end of fourteen hours analysis for soluble lime and iron were made by the Roma method. Calcium (calculated as the carbonate) analyzed .03% and iron as $Fe_2O_3$ was .015%. Allowable percentages for filter grade material are usually 0.1% calcium and .02% iron respectively calculated as indicated. After analysis the batch was struck, dewatered, the aqueous liquid recycled for re-use, the asbestos re-pulped with ten times its own weight of iron and calcium free water, and soaked overnight. This washing step was repeated and all wash water passed to waste. The final pulp was dried as a matte and made an excellent filter material in which there was practically no observable degradation of the fibers.

*Example 2*

Sixty pounds of short fiber milled grade 4M asbestos from the Crown Mine in the Globe, Arizona district analyzed twenty percent total calcium and one percent total iron. Soluble calcium was found to be twenty percent and soluble iron 0.2%. The sixty pounds of milled fiber were then dispersed in three hundred pounds of water, and titrated cold with gentle agitation using a two percent HCl solution until the pH began to drop sharply. At pH 4.5 titration was discontinued, and thirty pounds of commercial grade ammonium chloride added. Deflocculation and reflocculation were observed as in Example 1, and considerable sand and some iron dropped out of dispersion. The final analysis for soluble calcium carbonate was .03% and of iron as $Fe_2O_3$ was .005%. The final pulp after washing and drying made a good filter grade asbestos.

*Example 3*

Fifty grams of medium-short fiber asbestos, graded 4C from Napa, California, had a total calcium content of twenty percent, all of which was present as the carbonate. The total iron was 6.8%.

The fifty grams of fiber were dispered in 500 ml of water and titrated with 4% HCl solution until the pH was steady at 4. Fifty grams of chemical grade $NH_4Cl$ was added and boiled under a reflex condenser for ninety-six hours. After four rinsings the fiber was analyzed by the Roma method. It had .05% calcium carbonate and .015% soluble iron as $Fe_2O_3$.

*Example 4*

Twenty pounds of a semi-harsh fiber (graded 3Z) from the Apache Mine in Pinal County, Arizona had a total lime content of 0.1% and a total iron content of 0.3%. This semi-harsh fiber was then dispersed in two hundred pounds of water and twenty pounds of commerical grade $NH_4Cl$ added. The mixture was raised to a boil and maintained at this temperature for forty-eight hours. Analyzed by the Roma method it contained .04% calcium carbonate and .02% soluble iron as $Fe_2O_3$.

I have described my invention in detail and given specific examples thereof so that those skilled in the

I claim:

1. The method of treating asbestos fibers to remove contaminants therefrom which includes:
   (a) the step of soaking the fibers in an ammonium chloride solution.

2. The method of treating asbestos fibers to remove contaminants therefrom which includes:
   (a) the step of first treating the fibers with a dilute solution of hydrochloric acid to solubilize at least some of the lime content thereof, and then
   (b) soaking such fibers in an ammonium chloride solution.

3. The method of treating asbestos fibers to remove contaminants therefrom which includes:
   (a) the steps of dispersing such fibers in a hot aqueous solution of ammonium chloride solution containing between about five percent and ten percent of ammonium chloride, and
   (b) soaking such fibers in the said hot solution until a standard test shows the soluble calcium carbonate to be less than 0.1% and the soluble iron calculated as haematite is less than .02%.

4. The method defined in claim 3 which includes:
   (a) the step of agitating the solution and at the same time introducing a magnet therein to remove a portion of the iron thereby and drop out insoluble sand and the like particles.

5. The method of treating asbestos fibers to remove contaminants therefrom which comprises:
   (a) dispersing milled fibers in water,
   (b) titrating with a dilute hydrochloric acid solution until the pH remains steady at about 4,
   (c) adding ammonium chloride to the solution in sufficient amount to produce a five to ten percent ammonium chloride solution,
   (d) heating the solution to boiling,
   (e) continuing to soak the fibers in such solution through a resulting deflocculating and reflocculating period until solubility tests show a soluble calcium carbonate of less than 0.1% and a soluble haematite iron content of less than .02%, and
   (f) then washing and drying the resulting fiber pulp.

6. The method of treating asbestos fibers to remove contaminants therefrom which comprises:
   (a) dispersing milled fibers in water in proportion of five to fifteen parts by weight of fibers to one hundred parts by weight of water,
   (b) titrating with a dilute hydrochloride acid solution until the pH remains steady at about 4,
   (c) adding ammonium chloride to the solution in sufficient amount to produce a five to ten percent ammonium chloride solution,
   (d) heating the solution to boiling,
   (e) continuing to soak the fibers in such solution through a resulting deflocculating and reflocculating period until solubility tests show a soluble calcium carbonate of less than 0.1% and a soluble haematite iron content or less than .02%, and
   (f) then washing and drying the resulting fiber pulp.

7. The method of treating asbestos fibers to remove contaminants therefrom which comprises:
   (a) dispersing milled fibers in water in proportion of ten parts by weight or fiber and one hundred parts by weight of water,
   (b) titrating with a dilute hydrochloride acid solution until the pH remains steady at about 4,
   (c) adding ammonium chloride to the solution in sufficient amount to produce a five to ten percent ammonium chloride solution,
   (d) heating the solution to boiling,
   (e) continuing to soak the fibers in such solution through a resulting deflocculating and reflocculating period until solubility tests show a soluble haematite iron content of less than .02%, and
   (f) then washing and drying the resulting fiber pulp.

8. The method of producing a filter grade asbestos fiber which comprises:
   (a) first selecting a commercial milled asbestos fiber commercially graded between 3M and 4K,
   (b) determining the total lime and iron and soluble iron and lime in such selected fibers,
   (c) dispersing said selected fibers in water in proportion of about one part of fiber to ten parts of water, said dispersed fibers appearing in the water as flocs,
   (d) titrating with dilute hydrochloride acid until the pH of the solution remains stable at about pH 4,
   (e) adding five to ten parts of ammonium chloride to the solution,
   (f) heating the solution to boiling and continuing soaking of the fibers as they are observed to deflocculate and then reflocculate,
   (g) gently agitating the solution during the deflocculated period and at the same time introducing a magnet therein to remove a portion of the iron and at the same time to drop out insoluble sand particles and the like and remove some of the iron,
   (h) continuing soaking until tests show sufficiently low soluble lime and iron,
   (i) washing the solution thoroughly from the fibers, and,
   (j) finally drying the same as a matte.

References Cited by the Examiner

UNITED STATES PATENTS

| 90,565 | 5/69 | Lynd | 23—110 |
|---|---|---|---|
| 1,031,498 | 7/12 | Whitney | 23—110.2 |
| 1,346,316 | 7/20 | Hill | 23—110.2 |

FOREIGN PATENTS 279,694  11/27  Great Britain.

MAURICE A. BRINDISI, *Primary Examiner.*